United States Patent
Iji

[11] Patent Number: 6,156,865
[45] Date of Patent: Dec. 5, 2000

[54] FLAME RETARDANT THERMOSETTING RESIN COMPOSITION

[75] Inventor: Masatoshi Iji, Tokyo, Japan

[73] Assignee: NEC Corporation, Tokyo, Japan

[21] Appl. No.: 09/195,042

[22] Filed: Nov. 19, 1998

[51] Int. Cl.$^7$ .................................................. C08G 65/08
[52] U.S. Cl. ............................................. 528/98; 528/101
[58] Field of Search ............................. 528/98, 100, 101, 528/148, 152, 159

[56] References Cited

U.S. PATENT DOCUMENTS

| | | | |
|---|---|---|---|
| 4,046,721 | 9/1977 | Austin | 260/2.5 |
| 4,614,783 | 9/1986 | Daimer | 525/504 |
| 5,571,854 | 11/1996 | Ishida | 524/342 |
| 5,859,169 | 1/1999 | Burkhart | 528/129 |

FOREIGN PATENT DOCUMENTS

| | | |
|---|---|---|
| 58-194874 | 11/1983 | Japan . |
| 59-20321 | 2/1984 | Japan . |
| 59-62673 | 4/1984 | Japan . |
| 61-47725 | 3/1986 | Japan . |
| 62-22823 | 1/1987 | Japan . |
| 63-275626 | 11/1988 | Japan . |
| 64-1755 | 1/1989 | Japan . |
| 64-65116 | 3/1989 | Japan . |
| 1-163172 | 6/1989 | Japan . |
| 2-300255 | 12/1990 | Japan . |
| 3-12417 | 1/1991 | Japan . |
| 3-195722 | 3/1991 | Japan . |
| 3-62822 | 3/1991 | Japan . |
| 3-134051 | 6/1991 | Japan . |
| 3-220226 | 9/1991 | Japan . |
| 3-237125 | 10/1991 | Japan . |
| 3-285910 | 12/1991 | Japan . |
| 4-120126 | 4/1992 | Japan . |
| 4-175331 | 6/1992 | Japan . |
| 4-226123 | 8/1992 | Japan . |
| 4-264155 | 9/1992 | Japan . |
| 5-9144 | 1/1993 | Japan . |
| 5-67703 | 3/1993 | Japan . |
| 5-67707 | 3/1993 | Japan . |
| 5-217702 | 8/1993 | Japan . |
| 5-287219 | 11/1993 | Japan . |
| 6-25510 | 2/1994 | Japan . |
| 6-63939 | 3/1994 | Japan . |
| 6-239967 | 8/1994 | Japan . |
| 6-271648 | 9/1994 | Japan . |
| 7-90052 | 4/1995 | Japan . |
| 7-196772 | 8/1995 | Japan . |
| 7-316269 | 12/1995 | Japan . |
| 8-41292 | 2/1996 | Japan . |
| 8-100049 | 4/1996 | Japan . |
| 8-109239 | 4/1996 | Japan . |
| 9-012677 | 1/1997 | Japan . |
| 10-338682 | 12/1998 | Japan . |

*Primary Examiner*—Paul R. Michl
*Attorney, Agent, or Firm*—Young & Thompson

[57] ABSTRACT

A thermosetting epoxy resin composition having a low environmental load and a high flame retardancy includes a compound represented by the following formula 1 and a novolac compound represented by the following formula 2 as essential components:

$$X-R_1-X \qquad \text{Formula 1}$$

X being a functional group, capable of reacting with a functional group Y of the formula 2; and $R_1$ being a crystalline functional group having a phenyl group,

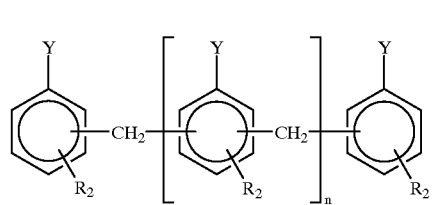

Formula 2

Y being a functional group capable of reacting with the functional group X in the compound of the formula 1; $R_2$ being a functional group capable of reacting with the functional group X, a hydrocarbon having 1 to 3 carbon atoms, or hydrogen; and n is an integer of 0 to 20.

18 Claims, 5 Drawing Sheets

EPOXY RESIN A + PHENOL RESIN A

EPOXY RESIN A + PHENOL RESIN B

EPOXY RESIN B + PHENOL RESIN A

EPOXY RESIN C + PHENOL RESIN A

EPOXY RESIN D + PHENOL RESIN A

CROSSLINKING STRUCTURE OF CURED ARTICLE

FLAME RETARDANT THERMOSETTING RESIN COMPOSITION

BACKGROUND OF THE INVENTION (1) Field of the Invention

The present invention relates to a thermosetting resin composition having a low environmental load and a high flame retardancy.

(2) Description of the Prior Art

Thermosetting resins have widely been used as electronically insulating materials and building materials because of good insulating properties, heat resistance and strength, but these resins are usually poor in flame retardancy. Therefore, when they are used for the above use purposes, a flame retardant is often added thereto.

As the flame retardant, compounds including halogens such as bromine and chlorine and compounds including phosphorus have extensively been used. In the case of the former compounds, however, a poisonous halogen gas is generated at a fire of a resin product including the halogen or at its incineration after disposal. In the case of the latter compounds, the poisonous gas is scarcely generated at the combustion of a resin product including phosphorus, but when it is discarded for land reclamation, the poisonous phosphorus compound is easily dissolved out. Both the cases have a problem that an environmental load is serious.

On the contrary, it is known that a hydrate of an inorganic substance having a low environmental load such as a hydrate of aluminum hydroxide also has a flame retardant effect, but it is necessary to add a large amount of the hydrate to the resin. Hence, the employment of the hydrate has a bad influence on moldability and other characteristics, and for this reason, it is not general-purpose.

For the flame retardation under the low environ- mental load, it can be contemplated to investigate a crosslinking structure of a thermosetting resin composition with the intention of improving the flame retardancy of the 15 resin itself. In a usual combustion of plastics, it is accepted that the plastics are thermally decomposed to generate combustible decomposition products, and they ignite to advance the combustion (Hanabusa Kazuta, "Flame Retardation of Plastics", Nikkan Kogyo Newspaper Publishing Co., p. 39–41, Jun. 26, 1978). It has been reported that in the case of a thermosetting resin, if this resin includes an aromatic moiety in its structure or has a high crosslinking density, a ratio of residual carbon is high at the time of heating, so that thermal decomposition resistance, i.e., heat resistance is high (Tadashi Jinbo, "Epoxy Resin Handbook", Nikkan Kogyo Newspaper Publishing Co., p. 368–369, Dec. 25, 1987).

Heretofore, for the improvement of the flame retardancy, it has been taken as a main means to improve the heat resistance in such a way. Usually, for a combination of a resin which is a main material to be thermally cured and a curing agent, materials including aromatic compounds are selected, and the resin which is the main material and the curing agent are usually blended with each other without excess and lack so that the reactive functional groups of the resin as the main material and the curing agent may react in a ratio of 1:1 in terms of chemical equivalent, whereby a crosslinking density which is indexed by a glass transition temperature of a cured material can be maximized.

However, even if the aromatic compounds are used and the resin as the main material and the curing agent are blended in an equivalent ratio to heighten the crosslinking density and to thereby improve the heat resistance, the flame retardancy is often insufficient. For example, even in a combination system of a phenol novolac curing agent and a cresol novolac type epoxy resin which is one of thermosetting aromatic resins having the most excellent glass transition temperature and heat resistance, the flame retardancy is insufficient, and to such a system, a bromine compound is usually added as a flame retardant (Keishou Miyasaka, "Plastic Dictionary", Asakura Shoten Co., Ltd,, p. 273, Mar. 1, 1992).

This reason would be considered to be that the flame retardancy of the resin is evaluated by its self-extinguishing properties after ignition (a combustion test method by UL94) and its oxygen demand for combustion (an oxygen index method by JIS-K-7201) in accordance with stipulated evaluation procedures, and hence not only the heat resistance of the resin but also another factor such as the formability of a non-combustible structure typified by a graphite structure has a large influence on the evaluation.

On the other hand, as the thermosetting resin compositions, combinations of epoxy resins including a crystalline biphenyl group and naphthalene group in the structure and phenol novolac resins as the curing agents have been already investigated, but with regard to the effects of these combinations, the improvement of the crack resistance of molded products such as IC packages, and the like are merely known (Japanese Patent Application Laid-open Nos. 47725/1986 and 12417/1991), and a relation between a composition, particularly a crosslinking structure of these combinations and the flame retardancy is not known.

The flame retardants including halogens and phosphorus which have been heretofore used in order to improve the flame retardancy of the thermosetting resins have a problem that their environmental load is large, as described above.

In addition, when it is attempted to improve the flame retardancy of the resin itself without adding any flame retardant, it has heretofore been a solution means to improve the heat resistance (the thermal decomposition resistance) of the resin, but the resin having the high heat resistance does not always exhibit the sufficient flame retardancy.

SUMMARY OF THE INVENTION

Thus, an object of the present invention is to provide a thermosetting resin having a structure which enables the improvement of flame retardancy itself.

The present invention for solving the above problems is directed to a thermosetting resin composition including a compound represented by the formula 1 and a novolac compound represented by the formula 2 as essential components:

$$X-R_1-X \qquad \text{Formula 1}$$

wherein X is a functional group capable of reacting with a functional group Y in the compound of the formula 2; and $R_1$ is a crystalline functional group having a phenyl group,

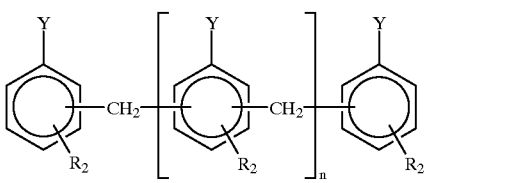

Formula 2 wherein Y is a functional group capable of reacting with the functional group X in the compound of the formula 1; $R_2$ is a functional group capable of reacting with the functional group X in the compound of the formula 1, a hydrocarbon having 1 to 3 carbon atoms, or hydrogen; and n is an integer of 1 to 20.

An effect of the present invention is to permit providing a thermosetting resin composition having a high flame retardancy by itself without adding any conventional flame retardant having a large environmental load.

DETAILED DESCRIPTION OF PREFERRED EMBODIMENTS

Figure 1:
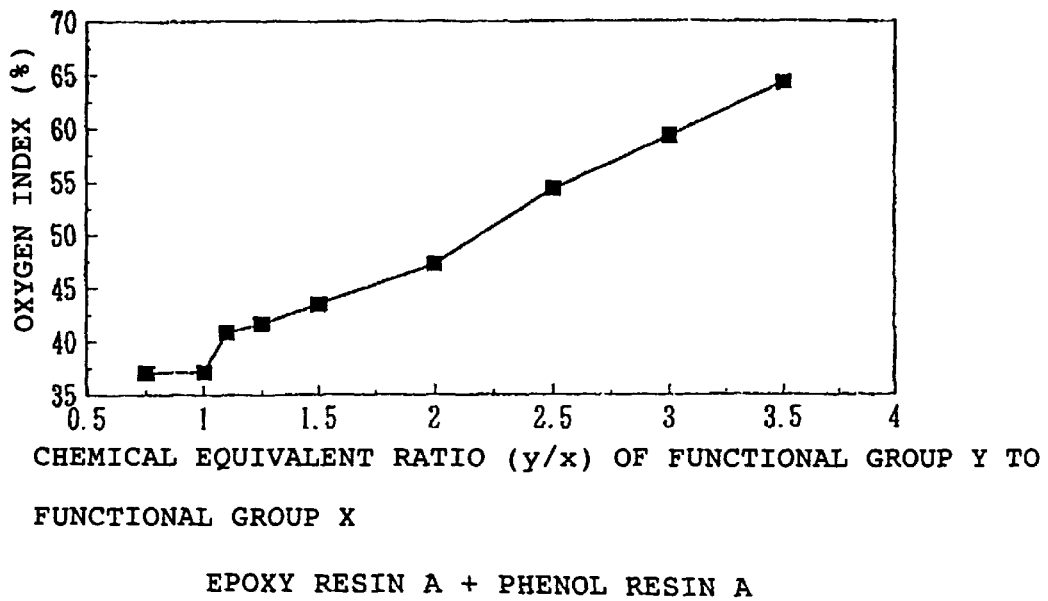
FIG. 1 is a diagram showing the results of an oxygen index analysis of molded articles (Examples 1 to 9) according to the present invention.

A crystalline functional group $R_1$ having a phenyl group in a compound represented by the formula 1 is a highly crystalline functional group which is characterized by having the phenyl group, being mutually regularly arranged, and being easily oriented. Typical examples of the functional group $R_1$ include biphenyl, 3,3',5,5'-tetramethylbiphenyl, naphthalene, 2,2-diphenylpropane, biphenyl ether, diphenylmethane, diphenylsulfone, diaminodiphenylmethane and analogues thereof. Above all, biphenyl, naphthalene, 2,2-diphenylpropane, diphenylmethane and analogues thereof are paricularly preferable. The crystalline functional group is effective to improve flame retardancy.

The compound of the formula 1 may be partially incorporated with a polymer obtained by the addition polymerization or the condensation polymerization of $R_1$, but in this case, the polymerization degree of this polymer is preferably 5 or less and the content ratio of the polymer is preferably 60% by weight or less based on the total weight of the compound having the formula 1. If the polymerization degree and the content ratio of the polymer are in excess of these values, the improvement of the flame retardancy decreases on occasion. A typical example of the above polymer is a polymer polymerized by adding the compound 1 in which X is a hydroxyl group, to the compound 1 in which X is an epoxy group.

A combination of the functional group X of the compound represented by the formula 1 and the functional group $R_2$ which can react with a functional group Y of a compound represented by the formula 2 and the above functional group X is such as to be reactable at a usual molding temperature and at a postcuring temperature, i.e., at a temperature of room temperature to about 200° C. In particular, it is desirable that either of X and Y is the functional group containing the epoxy group, because in such a case, a crosslinking reaction rate is so appropriate that a crosslinking structure having the high flame retardancy can be easily formed under usual molding conditions.

Examples of the functional group containing the epoxy group include glycidyl, glycidoxy, glycidylamine and alicyclic epoxy. Furthermore, examples of the functional group which can be combined with the functional group containing the epoxy group include a hydroxyl group, an amino group and a carboxyl group. Above all, the combination of the glycidoxy as X and the hydroxyl groups as Y and $R_2$ is preferable from the viewpoints of not only the flame retardancy but also the easiness of kneading and molding, moisture resistance and electrical characteristics of a cured product after the crosslinking reaction.

The functional group $R_2$ in a novolac compound represented by the formula 2 is a functional group which can react with X, a hydrocarbon having 1 to 5 carbon atoms, or hydrogen. The novolac structure of the formula 2 may be incorporated with a phenyl group to which Y is not added, but in this case, the ratio of the Y-free phenyl group is preferably 50% by weight or less of the total phenyl groups in view of the flame retardancy. Furthermore, n in the formula 2 is suitably in the range of 1 to 20, and if n is in excess of this range, viscosity in a kneading step is too high, so that mixing with other materials is nonuniform and moldability is impaired on occasion. In addition, the novolac compounds having n's in this range may be mixed.

With regard to preferable examples of the compounds having the formulae 1 and 2, examples of the compound having the formula 1 include 3,3',5,5'-tetramethylbiphenyl-4,4'-diglycidyl ether, biphenyl-4,4'-diglycidyl ether, naphthalene-1,6-diglycidyl ether, diglycidyl ether of bisphenol A and diglycidyl ether of bisphenol F. They can be used singly or in the form of a mixture thereof. On the other hand, the compound having the formula 2 is a phenol novolac having the formula 2 in which Y is a hydroxyl group, and $R_2$ is a hydroxyl group, hydrogen or a hydrocarbon, and typical examples thereof include a phenol novolac resin, a cresol novolac resin, a catechol novolac resin, a naphthol novolac resin, a phenol-xylenediol novolac and a catechol-xylenediol novolac. Above all, the employment of the catechol novolac resin or a combination of the catechol novolac resin and another material is preferable, whereby a glass transition temperature of a cured product of a resin composition is more excellent than the other novolacs, so that the flame retardancy and the heat resistance can be successfully balanced.

Furthermore, in the composition of the present invention, the compound having the formula 1 is preferably blended with the compound of the formula 2 so that the total chemical equivalent of the functional group Y and the functional group $R_2$ capable of reacting with the functional group X of the compound having the formula 1 which are present in the novolac of the compound of the formula 2 may be in excess of the chemical equivalent of the functional group X of the compound having the formula 1, whereby the flame retardancy can be remarkably improved. Concretely, when a ratio of the total chemical equivalent of the functional group Y and the functional group $R_2$ in the compound of the formula 2 to that of the functional group X in the compound having the formula 1 is 1.1 or more, the flame retardancy can be particularly effectively obtained.

However, if the total amount of Y and $R_2$ is too excessive, a curing reaction is insufficient. In consequence, a bad influence on the flame retardancy is small, but molding characteristics such as mold release properties and curing properties as well as other physical properties such as the heat resistance and strength are badly affected, so that such a composition cannot be sufficiently utilized as a thermosetting resin itself. Accordingly, the total amount of Y and $R_2$ should be within such a range that the curing reaction can take place. For example, with regard to the upper limit of the excessive amount of the compound having the formula 2, in the case of the phenol novolac resin, the ratio of the chemical equivalent of the hydroxyl group of the phenol novolac resin to that of the functional group X of the compound 1 is preferably 3.0 or less, and in the case of the catechol novolac resin, the ratio is preferably 3.5 or less. If the ratio is in excess of each of the above levels, the curing does not proceed smoothly during the molding, which has a bad influence on the molding characteristics as well as physical properties such as the heat resistance and the strength of the cured product.

Moreover, the total amount of the compounds represented by the formulae 1 and 2 is preferably 60% by weight or more of the resin component in the resin composition for the sake of the improvement of the flame retardancy.

To the composition of the present invention, various additives can be added as needed, and examples of the additives include inorganic fillers such as silica powder, alumina powder and glass fiber, curing accelerators such as phosphorus compounds, e.g., triphenylphosphine, and amine compounds, mold releasing agents such as carnauba wax and stearates, finishing agents such as silane coupling agents for the inorganic fillers, diluents such as various organic solvents, and colorants such as carbon. Moreover, if necessary, usual flame retardants such as halogen compounds and phosphorus compounds can be added to the composition. These additives can further improve the flame retardancy effect without impairing the effect.

The composition can be prepared by premixing the respective constitutional materials as needed by the use of a ribbon blender or a Henschel mixer, and then mixing the premixed material by the use of heating rolls, a kneader, a batch mixer or the like. Then, after an organic solvent and water have been removed from the resultant composition as needed, the composition is heated under predetermined molding conditions by a transfer molding machine or a heating press molding machine to bring about a crosslinking reaction and to thereby cure it. In consequence, a cured and molded article having the excellent flame retardancy can be obtained.

As understood from the foregoing, in the composition of the present invention, the compound of the formula 2 is blended with the compound of the formula 1, the chemical equivalent of the compound having the formula 2 being in excess of that of the compound having the formula 1. As a result, the crosslinking density of the cured article deteriorates and hence the heat resistance also deteriorates, but the flame retardancy can be improved. This fact indicates that definitely, a factor other than the heat resistance has a large influence on the flame retardancy, and it can be presumed that the above functional effect is due to the formation of a crosslinking structure having the high flame retardancy which is peculiar to the cured product of the composition according to the present invention.

A thermosetting resin composition which is a particularly preferable embodiment of the present invention is a flame retardant resin composition including, as essential components, an epoxy resin and a phenol resin analogue in which a hydroxyl group is bonded to an aromatic hydrocarbon, and the epoxy resin is represented by the formula 3

Formula 3

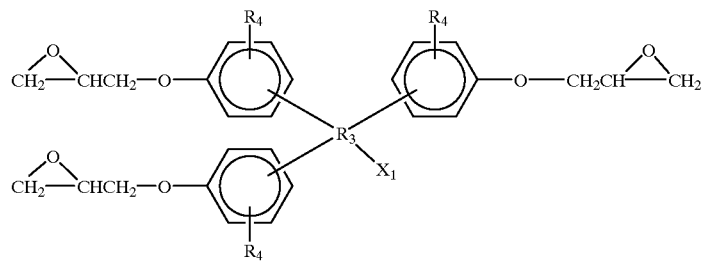

wherein $X_1$ is hydrogen, a glycidyl ether, a hydrocarbon group having 1 to 10 carbon atoms, a glycidyloxyphenyl group or a glycidyloxyphenyl group to the phenyl group of which $R_4$ is attached; $R_3$ is a hydrocarbon having 1 to 10 carbon atoms; and $R_4$ is hydrogen or a hydrocarbon group having 1 to 10 carbon atoms.

The phenol resin analogue referred to here means a resin including phenol or naphthol.

Typical examples of the epoxy resin which can be used in the present invention include tetrakis(glycidyloxyphenyl) ethane, tetrakis (glycidyloxymethylphenyl) ethane, tetrakis (glycidyloxyphenyl)methane, trikis(glycidyloxyphenyl) ethane, trikis(glycidyloxyphenyl)methane, trikis (glycidyloxyphenyl)methylethane, trikis (glycidyloxyphenyl)methylpropane and tetrakis (glycidyloxyphenyl)pentane.

This kind of epoxy resin can exhibit an effect even when used together with another kind of epoxy resin, and the employment of the above epoxy resin together with an epoxy resin having a crystalline skeleton is particularly effective. Typical examples of the crystalline epoxy resin include bisphenol A, biphenyl, naphthalene and analogues thereof. In this case, the amount of the crystalline epoxy resin which is added to the epoxy resin of the formula 3 is preferably 70% by weight with respect to the total amount of the epoxy resin. If the amount is in excess of this level, the feature of the flame retardancy cannot be exerted sometimes.

The above phenol resin is preferably a phenol novolac resin analogue represented by the formula 4

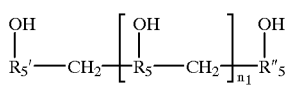

Formula 4 wherein $R_5$, $R'_5$ and $R''_5$ are each a hydrocarbon group having 100 or less carbon atoms and including a naphthalene group and a biphenyl group as essential components which may be in a single state or to which a phenyl group and/or a hydrocarbon group may be bonded; and $n_1$ is from 0 to 20.

In this formula, the number of the hydroxyl groups which are bonded to $R_5$ is in the range of 1 to 6. Typical examples of the phenol resin include naphthol novolac, polyvinylphenol, naphtholaralkyl resins, trivalent and more phenol novolac analogues including phenolbiphenyl resins, and polyvalent phenolic compounds synthesized from 4,4'-biphenol or naphthalenediol and bisphenol A, bisphenol F, bisphenol S, hydroquinone, resorcin or catechol in the presence of a condensation agent such as formaldehyde, acetaldehyde, benzaldehyde or p-hydroxybenzaldehyde. The phenolaralkyl resin mentioned above can be synthesized by the Friedel-Crafts condensation of phenol and $\alpha,\alpha'$-dimethoxyparaxylene, and the naphtholaralkyl resin mentioned above can be similarly synthesized by the Friedel-Crafts condensation of naphthol and $\alpha,\alpha'$-dimethoxyparaxylene.

In particular, the phenol resins represented by the following formulae 5, 6 and 7 are desirable:

such as an amine or a hydroxyl group-containing organic compound. A combination of the above curing agent and a phenol novolac resin is particularly preferable. When the above curing agent is used together with the other curing agent, a content of the other curing agent is preferably less than 70% by weight based on the total weight of the respective curing agents. If the content of the other curing agent is this ratio or more, the feature of the flame retardancy cannot be exerted at times.

A blend ratio between the phenol resin and the above epoxy resin is preferably such that the hydroxyl group in the phenol resin is in excess of its chemical equivalent which reacts with the epoxy group in the epoxy resin, and the ratio of the hydroxyl group to the chemical equivalent is preferably in the range of 1.25 to 3.0, more preferably 1.6 to 3.0.

In the composition of the present invention, when the blending is made so that the hydroxyl group in the curing agent may be in excess of the chemical equivalent corresponding to the epoxy group in the epoxy resin, the flame retardancy can be remarkably improved. Concretely, when the ratio of the hydroxyl group to the chemical equivalent corresponding to the epoxy group is 1.25 or more, the flame retardancy can be particularly effectively improved. However, if the amount of the hydroxyl group is too excessive, the curing reaction is insufficient. In consequence, a bad influence on the flame retardancy is small, but molding characteristics such as mold release properties and curing properties as well as other physical properties such as the heat resistance, strength and absorption resistance are badly affected, so that a use of the epoxy resin composition itself is impaired. Accordingly, the

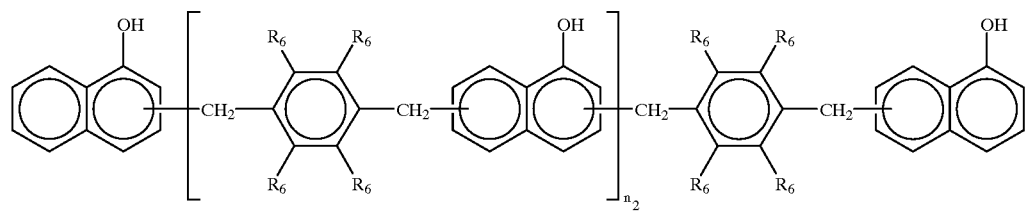

Formula 5

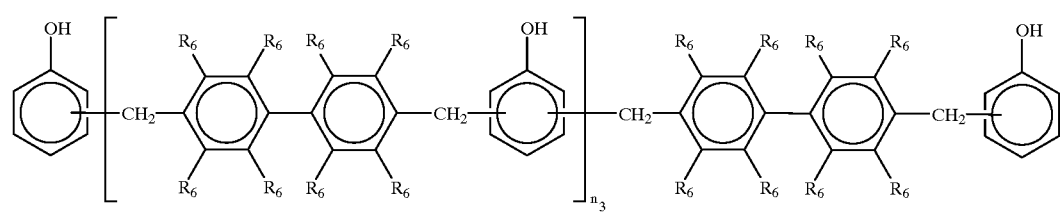

Formula 6

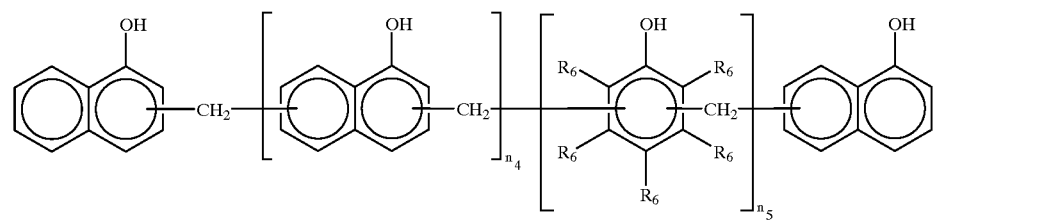

Formula 7 wherein $R_6$ is hydrogen or a hydrocarbon group having 1 to 6 carbon atoms; and $n_2$, $n_3$, $n_4$ and $n_5$ are each an integer of 0 to 20.

These curing agents can be used singly or in the form of a mixture of two or more thereof, and they may also be used together with a usual phenol resin or another curing agent amount of the hydroxyl group should be within such a range that the curing reaction can take place. With regard to the upper limit of the excessive amount of the hydroxyl group, the ratio of the hydroxyl group to the chemical equivalent corresponding to the epoxy group is preferably 3.0 or less. If this ratio is in excess of the above level, the curing does not proceed smoothly during the molding, which has a bad influence on the molding characteristics as well as physical properties such as the heat resistance and the strength of the cured product.

As understood from the foregoing, in the composition of the present invention, the curing agent is blended in an amount larger than the chemical equivalent corresponding to the epoxy resin, whereby a crosslinking density of the cured product lowers and hence the heat resistance deteriorates, but the flame retardancy can be improved, which definitely means that the flame retardancy is not decided by the factor of the heat resistance alone. It can be presumed that the improvement of the flame retardancy is due to the formation of the crosslinking structure having the high flame retardancy which is peculiar to the cured product of the composition according to the present invention.

A flame retardant mechanism of the flame retardant thermosetting resin composition according to an embodiment of the present invention will be described.

In the resin composition comprising the combination of the epoxy resin and the phenol resin analogue in the embodiment of the present invention, the high flame retardancy can be obtained. This reason is that the respective resins include large amounts of aromatic compounds, and the combination of these resins permits the formation of a specific original crosslinking structure, so that a precursor of graphite which is a multi-aromatic compound showing the flame retardancy at combustion is easily formed, thereby obtaining the high flame retardancy.

Figure 6:
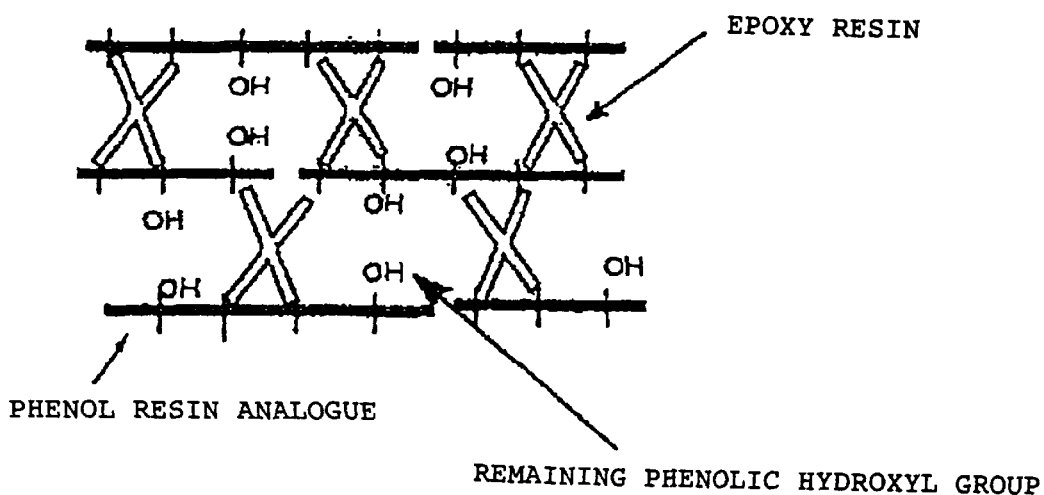
FIG. 6 is an imaginary view showing a flame retardant thermosetting resin of a preferred embodiment according to the present invention.
Figure 7:
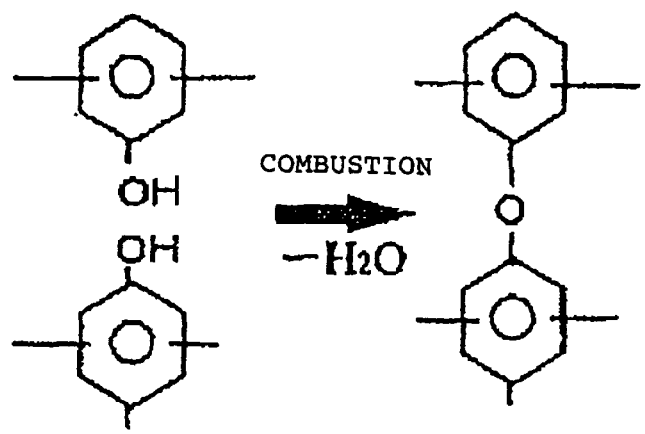
FIG. 7 is an imaginary view showing a flame retardancy mechanism of the flame retardant thermosetting resin of the preferred embodiment according to the present invention.
Figure 8:
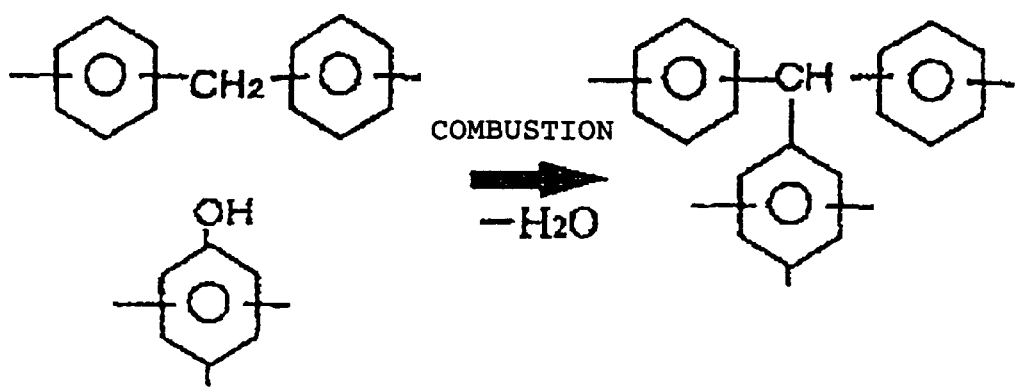
FIG. 8 is another imaginary view showing a flame retardancy mechanism of the flame retardant thermosetting resin of the preferred embodiment according to the present invention.

Furthermore, when the epoxy resin and the phenol resin analogue are blended in the embodiment of the present invention so that the hydroxyl group (the phenolic hydroxyl group) of the phenol resin analogue may be in excess of the epoxy group of the epoxy resin, the phenolic hydroxyl group remains in the crosslinking structure as shown in FIG. 6, so that the flame retardancy can be remarkably improved. In the case that the crosslinking density deteriorates in such a way, the flame retardancy can be improved, and this fact is not known at all so far. The reason for this improvement of the flame retardancy can be considered to be that the remaining phenolic hydroxyl groups bring about a dehydration-condensation reaction at the combustion as shown in FIGS. 7 and 8, thereby efficiently forming the above graphite precursor.

The phenol resin analogue preferably include an aromatic moiety to which the hydroxyl group is bonded, and a hydrophobic group. The reason why the presence of the hydrophobic group is preferable is that the hydroxyl group can easily move owing to the presence of the hydrophobic group, so that the condensation reaction can easily proceed. It is particularly desirable that the hydrophobic group is present between the aromatic moiety having the hydroxyl group and another aromatic moiety having the hydroxyl group, and the hydrophobic group is preferably the aromatic moiety to which the hydroxyl group is not bonded. As a result, the dehydration-condensation reaction easily occurs at the combustion, so that the flame retardancy can be improved to the utmost.

Next, the embodiments of the present invention will be described in accordance with examples.

EXAMPLES 1 TO 9

In these examples, as a compound represented by the formula 1, there was used a mixture (epoxy equivalent=170, softening point=104° C., hereinafter referred to as "epoxy resin A") of 50% of 3,3',5,5'-tetramethylbiphenyl-4,4'-diglycidyl ether represented by the following formula 8 in which $R_1$ and X of the formula 1 were 3,3',5,5-tetramethylbiphenyl and glycidoxy, respectively, and 50% of biphenyl-4,4'-diglycidyl ether represented by the following formula 9 in which $R_1$ and X of the formula 1 were biphenyl and glycidoxy, respectively:

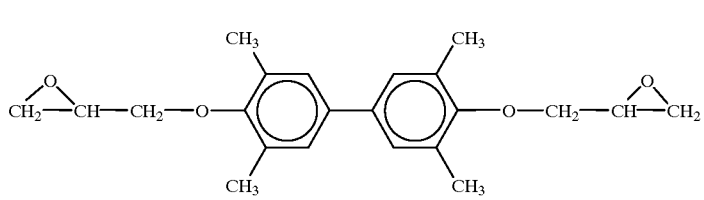

Formula 8: 3,3',5,5'-Tetramethylbiphenyl-4,4'-diglycidyl Ether

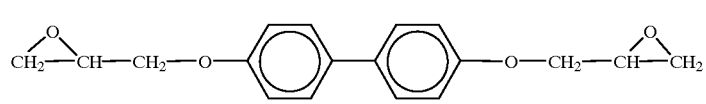

Formula 9: Biphenyl-4,4'-diglycidyl Ether

Furthermore, in these examples, as a compound represented by the formula 2, there was used a phenol novolac resin (hydroxyl group equivalent=106, softening point=80° C., weight-average molecular weight=1200, hereinafter referred to as "phenol resin A") represented by the following formula 10 in which $R_2$ and Y of the formula 2 were hydrogen and a hydroxyl group, respectively:

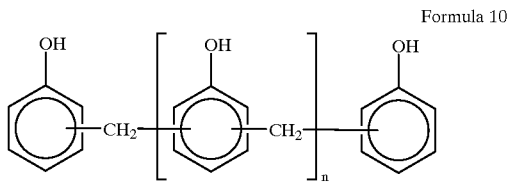

Formula 10: Phenol Novolac
Resin (Phenol Resin A)

31.0% by weight of the total of the epoxy resin A and the phenol resin A were blended with other additives, i.e., 0.5% by weight of triphenylphosphine, 0.5% by weight of carnauba wax and 68.0% by weight of silica powder (molten silica having an average particle diameter of 25 μm), and the blend was then mixed by a Henschel mixer. The mixture was kneaded at a resin temperature of 100 to 110° C. for 5 minutes by heating rolls, cooled by a cooling press, shredded by a mortar, and then passed through a 6 mesh sieve, thereby preparing a molding material.

Here, each content ratio (% by weight) between the epoxy resin A and the phenol resin A in the composition was such that the amount of a glycidoxy group (a functional group X) of the epoxy resin A and the amount of a hydroxyl group (a functional group Y) of the phenol resin A were present in a ratio shown in Table 1 (which was an equivalent ratio of the functional group Y to the functional group X, and it would be hereinafter referred to as "y/x").

Next, the above molding material was molded at 175° C. for 6 minutes by a transfer molding machine. As an index of moldability at this time, the release properties from a mold and the curing properties (hardness) of a molded article are shown in Table 1.

This molded article was further heated at 175° C. for 6 hours to postcure it, and the thus postcured article was then cut into a predetermined size to prepare a test piece. Next, the flame retardancy of this test piece was evaluated in accordance with an oxygen index method (JIS-K-7201), and in addition, its glass transition temperature was measured by a thermal machine analysis (TMA)(sample length=10–11 mm, atmosphere=air, temperature rise velocity=5° C/min, load=2 g, temperature range=room temperature to 300° C.). The results of these evaluations are also shown in Table 1.

Moreover, the results of the oxygen indexes are particularly shown in FIG. 1. Here, the higher the oxygen index is, the better the flame retardancy is. As understood from the above results, the flame retardancy can be particularly improved in the y/x ratio range of 1.1 or more in which the resin is curable.

EXAMPLES 10 TO 19

As a compound represented by the formula 1, the same epoxy resin A as used in Examples 1 to 9, and as a compound represented by the formula 2, a catechol novolac resin (hydroxyl group equivalent=61, softening point=107° C., weight-average molecular weight=990, hereinafter referred to as "phenol resin B") of the following formula 11 in which Y and $R_2$ of the formula 2 were both a hydroxyl group were mixed and kneaded in each ratio shown in Table 2 together with the same additives as in Examples 1 to 9 in the same manner as in Examples 1 to 9, followed by molding and evaluation. In this case, the content ratio of the total of these resins and the content ratios of the other additives in the resultant composition were the same as in Examples 1 to 9.

Here, an equivalent ratio of the total hydroxyl group amount of the functional groups Y and $R_2$ to a glycidoxy group amount of a functional group X was represented by y/x.

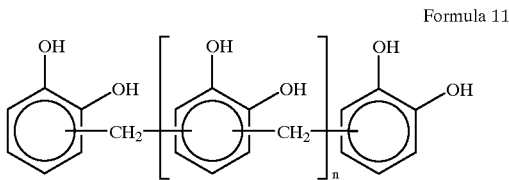

Formula 11

Formula 11 Catechol Novolac
Resin (Phenol Resin B)

Figure 2:
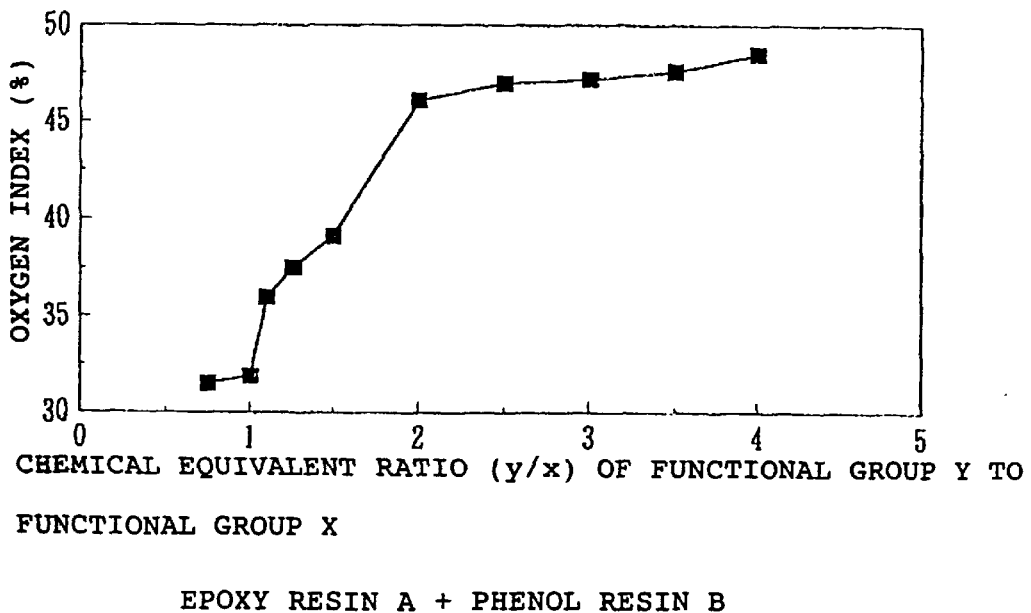
FIG. 2 is a diagram showing the results of the oxygen index analysis of molded articles (Examples 10 to 19) according to the present invention.

The oxygen indexes and the glass transition temperatures of the molded articles are shown in Table 2. Particularly, the results of the oxygen indexes are shown in FIG. 2. As understood from the above results, the flame retardancy can be particularly improved in the y/x ratio range of 1.1 or more in which the resin is curable.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Epoxy Resin A (wt %) | 21.2 | 19.2 | 18.5 | 17.5 | 16.1 | 13.9 | 12.2 | 10.9 | 9.9 |
| Phenol Resin A (wt %) | 9.8 | 11.8 | 12.5 | 13.5 | 14.9 | 17.1 | 18.8 | 20.1 | 21.1 |
| y/x | 0.75 | 1.0 | 1.1 | 1.25 | 1.5 | 2.0 | 2.5 | 3.0 | 3.5 |
| Oxygen Demand (%) | 37.1 | 37.2 | 40.9 | 41.7 | 43.5 | 47.3 | 54.3 | 59.2 | 64.2 |
| Glass Transition Temp. (° C.) | 104 | 141 | 136 | 133 | 114 | 96 | 91 | 86 | 75 |
| Mold Release Prop.* | ○ | ○ | ○ | ○ | ○ | ○ | ○ | ○ | Δ |
| Curing Prop.** | ○ | ○ | ○ | ○ | ○ | ○ | ○ | ○ | Δ |

*Mold release properties: ○ = Good, Δ = Poor, X = Release was impossible
**Curing properties: ○ = Completely cured, Δ = Soft, X = Uncured

TABLE 2

|  | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|
| Epoxy Resin A (wt %) | 24.5 | 22.8 | 22.2 | 21.4 | 20.2 | 18.1 | 16.4 | 15.0 | 13.7 | 12.7 |
| Phenol Resin B (wt %) | 6.5 | 8.2 | 8.8 | 9.6 | 10.8 | 12.9 | 14.6 | 16.0 | 17.3 | 18.3 |
| y/x | 0.75 | 1.0 | 1.1 | 1.25 | 1.5 | 2.0 | 2.5 | 3.0 | 3.5 | 4.0 |
| Oxygen Demand (%) | 31.5 | 31.9 | 36.0 | 37.5 | 39.1 | 46.1 | 47.0 | 47.2 | 47.6 | 48.5 |
| Glass Transition Temp. (° C.) | 125 | 190 | 185 | 178 | 172 | 153 | 141 | 133 | 122 | 115 |
| Mold Release Prop.* | ○ | ○ | ○ | ○ | ○ | ○ | ○ | ○ | ○ | Δ |
| Curing Prop.** | ○ | ○ | ○ | ○ | ○ | ○ | ○ | ○ | ○ | Δ |

*Mold release properties: ○ = Good, Δ = Poor, X = Release was impossible
**Curing properties: ○ = Completely cured, Δ = Soft, X = Uncured

EXAMPLES 20 TO 28

As a compound represented by the formula 1, a mixture [epoxy equivalent=189, viscosity=140 poise (room temperature), hereinafter referred to as "epoxy resin B"] of diglycidyl ether of bisphenol A represented by the following formula 12 in which $R_1$ and X of the formula 1 were 2,2-diphenylpropane and glycidoxy, respectively, and a dimer of the above formula 12 represented by the following formula 13 in a weight ratio of 87:13, and as a compound represented by the formula 2, the above phenol resin A were kneaded in each ratio shown in Table 3 together with the same additives as in Examples 1 to 9 at 100 to 110° C. for 5 minutes by heating rolls, followed by molding and evaluation in the same manner as in Examples 1 to 9. In this case, the content ratio of the total of these resins and the content ratios of the other additives in the resultant composition were the same as in Examples 1 to 9.

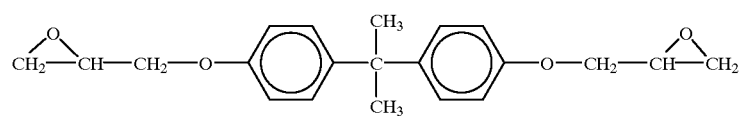

Formula 12: Diglycidyl Ether of Bisphenol A

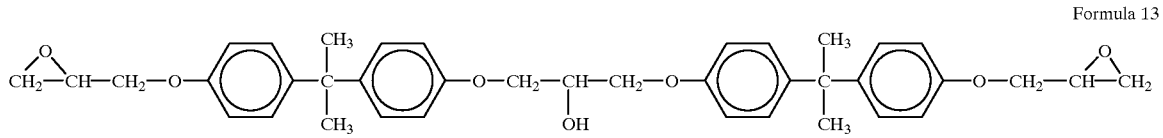

Formula 13: Dimer

Figure 3:
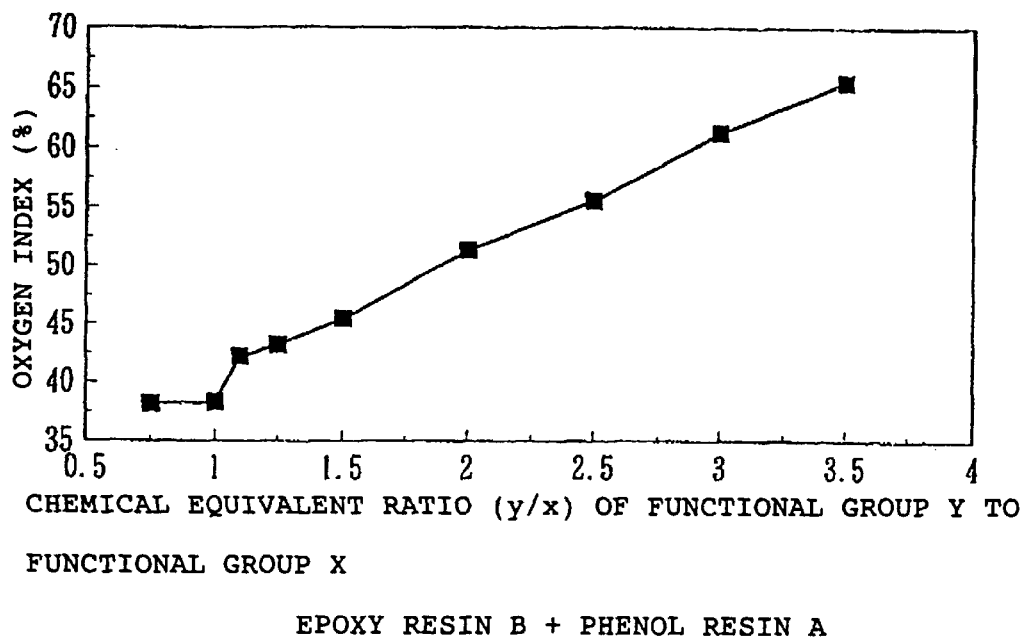
FIG. 3 is a diagram showing the results of the oxygen index analysis of molded articles (Examples 20 to 28) according to the present invention.

The results of the oxygen indexes and the glass transition temperatures of the molded articles are shown in Table 3. Particularly, the results of the oxygen indexes are shown in FIG. 3. As understood from the above results, when an equivalent ratio (y/x) of the hydroxyl group amount of the phenol resin A to the glycidoxy group amount of the epoxy resin B is 1.1 or more, and the resin is curable, the flame retardancy can be particularly improved.

TABLE 3

|  | Example 20 | Example 21 | Example 22 | Example 23 | Example 24 | Example 25 | Example 26 | Example 27 | Example 28 |
|---|---|---|---|---|---|---|---|---|---|
| Epoxy Resin B (wt %) | 22.0 | 20.0 | 19.3 | 18.4 | 17.0 | 14.8 | 13.1 | 11.7 | 10.6 |
| Phenol Resin A (wt %) | 9.0 | 11.0 | 11.7 | 12.6 | 14.0 | 16.2 | 17.9 | 19.3 | 20.4 |
| y/x | 0.75 | 1.0 | 1.1 | 1.25 | 1.5 | 2.0 | 2.5 | 3.0 | 3.5 |
| Oxygen Demand (%) | 38.2 | 38.3 | 42.2 | 43.2 | 45.4 | 51.3 | 55.5 | 61.2 | 65.5 |
| Glass Transition Temp. (° C.) | 80 | 122 | 115 | 111 | 101 | 90 | 82 | 78 | 69 |

TABLE 3-continued

|  | Example 20 | Example 21 | Example 22 | Example 23 | Example 24 | Example 25 | Example 26 | Example 27 | Example 28 |
|---|---|---|---|---|---|---|---|---|---|
| Mold Release Prop.* | ○ | ○ | ○ | ○ | ○ | ○ | ○ | ○ | Δ |
| Curing Prop.** | ○ | ○ | ○ | ○ | ○ | ○ | ○ | ○ | Δ |

*Mold release properties: ○ = Good, Δ = Poor, X = Release was impossible
**Curing properties: ○ = Completely cured, Δ = Soft, X = Uncured

EXAMPLES 29 TO 37

As a compound represented by the formula 1, naphthalene-1,6-diglycidyl ether (epoxy equivalent=152, hereinafter referred to as "epoxy resin C") represented by the following formula 14 in which $R_1$ and X of the formula 1 were naphthalene and glycidoxy, respectively, and as a compound represented by the formula 2, a phenol resin A were kneaded in each ratio shown in Table 4 together with the same additives as in Examples 1 to 9 at 100 to 110° C. for 5 minutes by heating rolls, followed by molding and evaluation in the same manner as in Examples 1 to 9. In this case, the content ratio of the total of these resins and the content ratios of the other additives in the resultant composition were the same as in Examples 1 to 9.

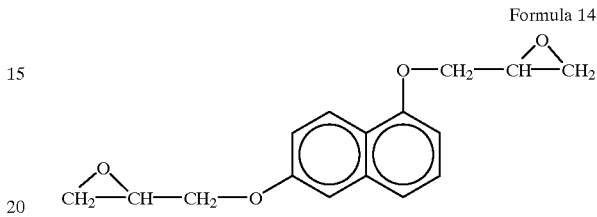

Formula 14: Naphthalene-1,6-diglycidyl Ether (Epoxy Resin C)

Figure 4:
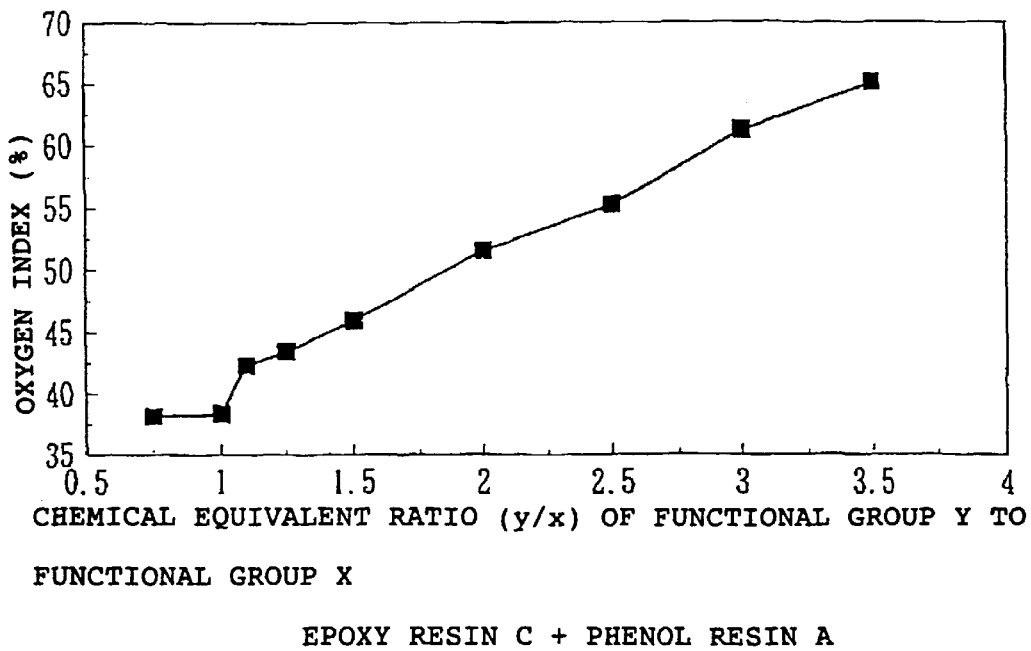
FIG. 4 is a diagram showing the results of the oxygen index analysis of molded articles (Examples 29 to 37) according to the present invention.

The results of the oxygen indexes and the glass transition temperatures of the molded articles are shown in Table 4. Particularly, the results of the oxygen indexes are shown in FIG. 4. As understood from the above results, when an equivalent ratio (y/x) of the hydroxyl group amount of the phenol resin A to the glycidoxy group amount of the epoxy resin C is 1.1 or more, and the resin is curable, the flame retardancy can be particularly improved.

TABLE 4

|  | Example 29 | Example 30 | Example 31 | Example 32 | Example 33 | Example 34 | Example 35 | Example 36 | Example 37 |
|---|---|---|---|---|---|---|---|---|---|
| Epoxy Resin C (wt %) | 205 | 18.4 | 17.7 | 16.7 | 15.3 | 13.1 | 11.4 | 10.2 | 9.1 |
| Phenol Resin A (wt %) | 10.5 | 12.6 | 13.3 | 14.3 | 15.7 | 17.9 | 19.6 | 20.8 | 21.9 |
| y/x | 0.75 | 1.0 | 1.1 | 1.25 | 1.5 | 2.0 | 2.5 | 3.0 | 3.5 |
| Oxygen Demand (%) | 38.2 | 38.4 | 42.4 | 43.5 | 46.0 | 51.6 | 55.3 | 61.2 | 65.1 |
| Glass Transition Temp. (° C.) | 116 | 132 | 127 | 122 | 112 | 95 | 88 | 83 | 72 |
| Mold Release Prop.* | ○ | ○ | ○ | ○ | ○ | ○ | ○ | ○ | Δ |
| Curing Prop.** | ○ | ○ | ○ | ○ | ○ | ○ | ○ | ○ | Δ |

*Mold release properties: ○ = Good, Δ = Poor, X = Release was impossible
**Curing properties: ○ = Completely cured, Δ = Soft, X = Uncured

COMPARATIVE EXAMPLES 1 TO 9

These comparative examples were carried out for comparison with the present invention. In order to compare with a compound of the formula 1, non-crystalline cresol novolac was used in place of a crystalline $R_1$ of the formula 1, and an orthocresol novolac epoxy resin (epoxy equivalent=194, softening point=80° C., weight-average molecular weight=2900, hereinafter referred to as "epoxy resin D") represented by the following formula 15 in which a glycidoxy group as a functional group X was attached to the above non-crystalline cresol novolac and a phenol resin A represented by the formula 10 used in the above example as a novolac compound of the formula 2 were mixed and kneaded in each ratio shown in Table 5 together with the same additives as in Examples 1 to 9 in the same manner as in Examples 1 to 9, followed by molding and evaluation. In this case, the content ratio of the total of these resins and the content ratios of the other additives in the resultant composition were the same as in Examples 1 to 9.

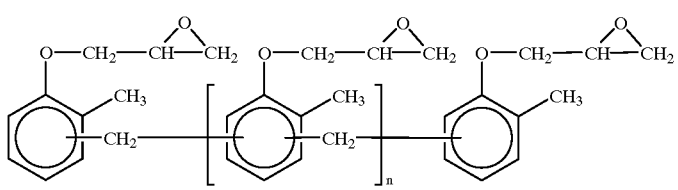

Formula 15

Formula 15: Orthocresol Novolac Epoxy Resin
(Epoxy Resin D)

Figure 5:
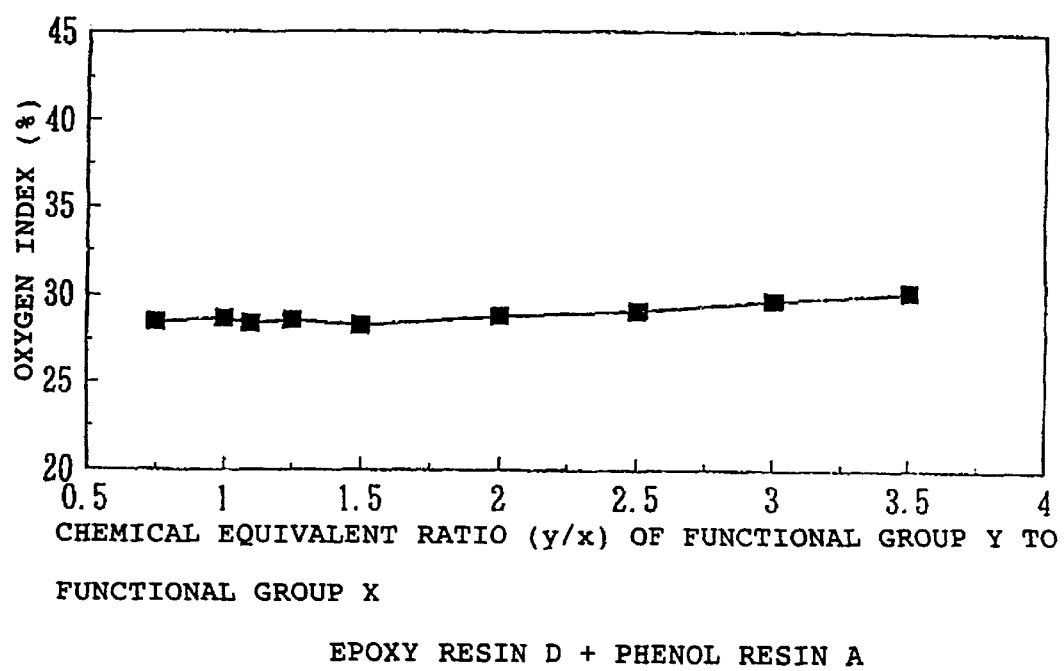
FIG. 5 is a diagram showing the results of the oxygen index analysis of molded articles described in Comparative Examples 1 to 9.

The results of the oxygen indexes and the glass transition temperatures of the molded articles are shown in Table 5. Particularly, the results of the oxygen indexes are shown in FIG. 5. As understood from the above results, as compared with the resin compositions of the examples, the glass transition temperatures are higher on the whole, but flame retardancy noticeably deteriorates. In addition, it is not observed that an equivalent ratio (y/x) of the hydroxyl group amount of the phenol resin A to the glycidoxy group amount of the epoxy resin D affects the flame retardancy.

EXAMPLES 38 TO 44

By a Henschel mixer, there were mixed, as an epoxy resin of the formula 3, an epoxy resin [tetrakis (glycidyloxyphenyl)ethane, epoxy equivalent=197, hereinafter referred to as "epoxy resin E"] in which $R_3$, $R_4$ and $X_1$ of the formula 3 were ethane, hydrogen and a glycidyloxyphenyl group, respectively, a compound represented by the formula 5 [$R_6$ is hydrogen, number-average molecular weight (Mn)=450, hydroxyl group equivalent=210, softening point=86° C., hereinafter referred to as "curing agent A"] as a phenol resin, 0.5% by weight of triphenylphosphine as another curing agent, 0.5% by weight of carnauba wax and

TABLE 5

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|
| Epoxy Resin D (wt %) | 22.1 | 20.2 | 19.5 | 18.6 | 17.2 | 15.0 | 13.3 | 11.9 | 10.8 |
| Phenol Resin A (wt %) | 8.9 | 10.8 | 11.5 | 12.4 | 13.8 | 16.0 | 17.7 | 19.1 | 20.2 |
| y/x | 0.75 | 1.0 | 1.1 | 1.25 | 1.5 | 2.0 | 2.5 | 3.0 | 3.5 |
| Oxygen Demand (%) | 28.5 | 28.7 | 28.4 | 28.6 | 28.3 | 28.8 | 29.1 | 29.7 | 30.2 |
| Glass Transition Temp. (° C.) | 148 | 175 | 169 | 160 | 153 | 125 | 108 | 98 | 89 |
| Mold Release Prop.* | ○ | ○ | ○ | ○ | ○ | ○ | ○ | ○ | Δ |
| Curing Prop.** | ○ | ○ | ○ | ○ | ○ | ○ | ○ | ○ | Δ |

*Mold release properties: ○ = Good, Δ = Poor, X = Release was impossible
**Curing properties: ○ = Completely cured, Δ = Soft, X = Uncured As described above in Examples 1 to 37, it is apparent that the combination systems of the crystalline epoxy resin which is the compound of the formula 1 and the phenol resin which is the novolac of the formula 2 regarding the present invention can exert the more excellent flame retardancy than the combination systems of the non-crystalline orthocresol novolac epoxy resin and the phenol resin which have the high glass transition temperature and the excellent heat resistance and which are shown in the comparative examples.

Furthermore, it is apparent that when the phenol resin of the formula 2 is blended with the epoxy resin of the formula 1, the chemical equivalent of the phenol resin having the formula 2 being in excess of that of the epoxy resin having the formula 1, i.e., when an equivalent ratio (y/x) of the hydroxyl group amount to the glycidoxy group amount is 1.1 or more, the excellent flame retardancy can be obtained. However, when the amount of the phenol resin of the formula 2 is excessively excessive, for example, in the case of phenol novolac, when the ratio (y/x) is more than 3.0, and in the case of catechol novolac, when the ratio (y/x) is more than 3.5, molding characteristics such as mold release properties and curing properties deteriorate, the glass transition temperature also extremely deteriorates and hence the heat resistance is poor, though the flame retardancy is not affected.

68.0% by weight of silica powder (molten silica having an average particle diameter of 25 μm). The resultant mixture was kneaded at a resin temperature of 100 to 110° C. for 5 minutes by heating rolls, cooled by a cooling press, shredded by a mortar, and then passed through a 6 mesh sieve, thereby preparing a molding material. Here, each content ratio (% by weight) between the epoxy resin E and the curing agent A in the composition was such that the epoxy group amount of the epoxy resin E and the hydroxyl group amount of the curing agent A were present in each ratio shown in Table 6, and the content ratios are also shown in Table 6.

The addition ratios of the epoxy resin and the curing agent to the composition can be obtained by calculating the following equations, and this is applicable to the subsequent examples and comparative examples:

$\alpha = \beta \cdot$ epoxy equivalent of epoxy resin/(hydroxyl group equivalent of curing agent$\cdot$y/x)

$\alpha + \beta = 31.0$ wherein $\alpha$ is the addition ratio (% by weight) of the epoxy resin; $\beta$ is the addition ratio (% by weight) of the curing agent; and y/x is an equivalent ratio of the hydroxyl group to the epoxy group.

Next, the above molding material was molded at 175° C. for 6 minutes by a transfer molding machine. As an index of moldability at this time, the release properties from a mold and the curing properties (hardness) of a molded article are shown in Table 6. This molded article was further heated at 175° C. for 6 hours to postcure it, and the thus postcured article was then cut into a predetermined size to prepare a test piece. Next, the flame retardancy of this test piece was evaluated in accordance with an oxygen index method (JIS-K-7201), and in addition, its glass transition temperature was measured by a thermal machine analysis (TMA) (sample length=10–11 mm, atmosphere=air, temperature rise velocity=5° C/min, load=2 g, temperature range=room temperature to 300° C.). The results of these evaluations are also shown in Table 6. Furthermore, the above flame retardancy test piece was boiled at 100° C. for 24 hours in pure water, and on the basis of a weight increase ratio at this time, a water absorption coefficient was measured.

EXAMPLES 45 TO 51

As an epoxy resin for the embodiments, an epoxy resin E, and as a phenol resin for the embodiments, a compound (hereinafter referred to as "curing agent B") of the formula 6 in which $R_6$ was hydrogen, a number-average molecular weight (Mn) was 500, a hydroxyl group equivalent was 198 and a softening point was 73° C. were kneaded together with the same additives as in Examples 38 to 44, followed by molding and evaluation. In this case, the content ratio of the total of these resins and the content ratios of the other additives in the resultant composition were the same as in Examples 38 to 44. The results of the oxygen indexes, the glass transition temperatures and the water absorption coefficients of the molded articles are shown in Table 7.

EXAMPLES 52 TO 58

As an epoxy resin for the embodiments, an epoxy resin E, and as a phenol resin for the embodiments, a compound (hereinafter referred to as "curing agent C") of the formula 7 in which $R_6$ was a methyl group, a number-average molecular weight (Mn) was 430, a hydroxyl group equivalent was 136 and a softening point was 101° C. were kneaded together with the same additives as in Examples 38 to 44, followed by molding and evaluation. In this case, the content ratio of the total of these resins and the content ratios of the other additives in the resultant composition were the same as in Examples 38 to 44. The results of the oxygen indexes, the glass transition temperatures and the water absorption coefficients of the molded articles are shown in Table 8.

EXAMPLES 59 TO 65

A resin component was first prepared by mixing, as epoxy resins for the embodiments, a mixture of 50% by weight of an epoxy resin E and 50% by weight of a mixture (epoxy equivalent=170, softening point=104° C., number-average molecular weight=460, hereinafter referred to as "epoxy resin F") of 50% by weight of 3,3',5,5'-tetramethylbiphenyl-4,4'-diglycidyl ether and 50% by weight of biphenyl-4,4'-diglycidyl ether as epoxy resins other than the formula 3, and as a phenol resin for the embodiments, a mixture of 60% by weight of a curing agent A and 40% by weight of a phenol novolac resin (number-molecular weight Mn-=500, hydroxyl group equivalent=107, softening point=90° C., hereinafter referred to as "curing agent D") as a phenol resin other than the phenol resins of the formulae 5, 6 and 7, and the resultant resin component was then mixed and kneaded together with the same additives as in Examples 38 to 44 in the same manner as in these examples, followed by molding and evaluation. In this case, the content ratio of the total of these resins and the content ratios of the other additives in the resultant composition were the same as in Examples 38 to 44. The results of the oxygen indexes, the glass transition temperatures and the water absorption coefficients of the molded articles are shown in Table 9.

EXAMPLES 66 TO 72

As an epoxy resin of the formula 3 for the embodiments, an epoxy resin trikis(glycidyloxymethylphenyl)methane (epoxy equivalent=164, hereinafter referred to as "epoxy resin G") in which $R_3$, $X_1$ and $R_4$ in the formula 3 were methane, hydrogen and a methyl group, respectively, and as a phenol resin for the embodiments, a curing agent B were kneaded together with the same additives in the same ratio and in the same manner as in Examples 38 to 44, followed by molding and evaluation. In this case, the content ratio of the total of these resins and the content ratios of the other additives in the resultant composition were the same as in Examples 38 to 44. The results of the oxygen indexes, the glass transition temperatures and the water absorption coefficients of the molded articles are shown in Table 10.

EXAMPLES 73 TO 79

As an epoxy resin of the formula 3 for the embodiments, an epoxy resin trikis(glycidyloxymethylphenyl)methylpropane (epoxy equivalent=164, hereinafter referred to as "epoxy resin H") in which $R_3$, $X_1$ and $R_4$ in the formula 3 were propane, a methyl group and hydrogen, respectively, and as a phenol resin for the embodiments, a curing agent A were kneaded together with the same additives in the same ratio and in the same manner as in Examples 38 to 44, followed by molding and evaluation. In this case, the content ratio of the total of these resins and the content ratios of the other additives in the resultant composition were the same as in Examples 38 to 44. The results of the oxygen indexes, the glass transition temperatures and the water absorption coefficients of the molded articles are shown in Table 11.

COMPARATIVE EXAMPLES 10 TO 15

As a typical polyfunctional epoxy resin other than epoxy resins regarding the present invention, an orthocresol novolac epoxy resin (epoxy equivalent=194, softening point=80° C., hereinafter referred to as "epoxy resin I") and a curing agent A were kneaded together with the same additives and in the same manner as in Examples 38 to 44 in each ratio shown in Table 12, followed by molding and evaluation. In this case, the content ratio of the total of these resins and the content ratios of the other additives in the resultant composition were the same as in Examples 38 to 44. The results of the oxygen indexes, the glass transition temperatures and the water absorption coefficients of the molded articles are shown in Table 12.

COMPARATIVE EXAMPLES 16 TO 21

As an epoxy resin other than epoxy resins regarding the present invention, an epoxy resin I, and as a phenol resin other than in the present invention, a curing agent D were kneaded together with the same additives and in the same manner as in Examples 38 to 44 in each ratio shown in Table 13, followed by molding and evaluation. In this case, the content ratio of the total of these resins and the content ratios of the other additives in the resultant composition were the same as in Examples 38 to 44. The results of the oxygen indexes, the glass transition temperatures and the water absorption coefficients of the molded articles are shown in Table 13.

TABLE 6

|  | Example 38 | Example 39 | Example 40 | Example 41 | Example 42 | Example 43 | Example 44 |
|---|---|---|---|---|---|---|---|
| y/x* | 0.75 | 1.0 | 1.25 | 1.6 | 2.0 | 3.0 | 3.5 |
| Oxygen Demand (%) | 51.4 | 52.2 | 55.7 | 57.5 | 61.4 | 65.6 | 65.9 |
| Glass Transition Temp. (° C.) | 167 | 170 | 158 | 142 | 111 | 105 | 100 |
| Water Absorption coef. (%) | 0.48 | 0.42 | 0.34 | 0.31 | 0.35 | 0.39 | 0.44 |
| Mold Release Prop.** | ○ | ○ | ○ | ○ | ○ | ○ | Δ |
| Curing Prop.*** | ○ | ○ | ○ | ○ | ○ | ○ | Δ |

*y/x: Equivalent ratio of the hydroxyl group in the curing agent to the epoxy group in the epoxy resin
**Mold release properties: ○ = Good, Δ = Poor, x = Release was impossible
*** Curing properties: ○ = Completely cured, Δ = Soft, x = Uncured

TABLE 7

|  | Example 45 | Example 46 | Example 47 | Example 48 | Example 49 | Example 50 | Example 51 |
|---|---|---|---|---|---|---|---|
| y/x | 0.75 | 1.0 | 1.25 | 1.6 | 2.0 | 3.0 | 3.5 |
| Oxygen Demand (%) | 60.9 | 61.8 | 64.7 | 67.0 | 68.9 | 70.8 | 72.0 |
| Glass Transition Temp. (° C.) | 159 | 165 | 154 | 140 | 108 | 100 | 98 |
| Water Absorption coef. (%) | 0.49 | 0.44 | 0.37 | 0.35 | 0.37 | 0.40 | 0.41 |
| Mold Release Properties | ○ | ○ | ○ | ○ | ○ | ○ | Δ |
| Curing Properties | ○ | ○ | ○ | ○ | ○ | ○ | Δ |

TABLE 8

|  | Example 52 | Example 53 | Example 54 | Example 55 | Example 56 | Example 57 | Example 58 |
|---|---|---|---|---|---|---|---|
| y/x | 0.75 | 1.0 | 1.25 | 1.6 | 2.0 | 3.0 | 3.5 |
| Oxygen Demand (%) | 48.5 | 49.0 | 53.1 | 55.1 | 56.8 | 58.0 | 59.3 |
| Glass Transition Temp. (° C.) | 155 | 169 | 156 | 141 | 113 | 104 | 98 |
| Water Absorption coef. (%) | 0.48 | 0.44 | 0.36 | 0.33 | 0.36 | 0.42 | 0.47 |
| Mold Release Properties | ○ | ○ | ○ | ○ | ○ | ○ | Δ |
| Curing Properties | ○ | ○ | ○ | ○ | ○ | ○ | Δ |

TABLE 9

|  | Example 59 | Example 60 | Example 61 | Example 62 | Example 63 | Example 64 | Example 65 |
|---|---|---|---|---|---|---|---|
| y/x | 0.75 | 1.0 | 1.25 | 1.6 | 2.0 | 3.0 | 3.5 |
| Oxygen Demand (%) | 47.3 | 47.4 | 51.0 | 53.2 | 55.9 | 57.7 | 57.9 |
| Glass Transition Temp. (° C.) | 143 | 153 | 144 | 130 | 101 | 95 | 91 |
| Water Absorption coef. (%) | 0.51 | 0.47 | 0.44 | 0.46 | 0.48 | 0.54 | 0.59 |
| Mold Release Properties | ○ | ○ | ○ | ○ | ○ | ○ | Δ |
| Curing Properties | ○ | ○ | ○ | ○ | ○ | ○ | Δ |

TABLE 10

|  | Example 66 | Example 67 | Example 68 | Example 69 | Example 70 | Example 71 | Example 72 |
|---|---|---|---|---|---|---|---|
| y/x | 0.75 | 1.0 | 1.25 | 1.6 | 2.0 | 3.0 | 3.5 |
| Oxygen Demand (%) | 59.2 | 60.0 | 63.4 | 66.1 | 67.5 | 68.8 | 69.7 |
| Glass Transition Temp. (° C.) | 166 | 151 | 149 | 146 | 105 | 97 | 95 |
| Water Absorption coef. (%) | 0.47 | 0.43 | 0.35 | 0.32 | 0.35 | 0.39 | 0.42 |
| Mold Release Properties | ○ | ○ | ○ | ○ | ○ | ○ | Δ |
| Curing Properties | ○ | ○ | ○ | ○ | ○ | ○ | Δ |

TABLE 11

|  | Example 73 | Example 74 | Example 75 | Example 76 | Example 77 | Example 78 | Example 79 |
|---|---|---|---|---|---|---|---|
| y/x | 0.75 | 1.0 | 1.25 | 1.6 | 2.0 | 3.0 | 3.5 |
| Oxygen Demand (%) | 49.1 | 50.3 | 64.8 | 66.6 | 57.9 | 59.1 | 60.1 |
| Glass Transition Temp. (° C.) | 154 | 152 | 163 | 138 | 105 | 100 | 96 |
| Water Absorption coef. (%) | 0.50 | 0.46 | 0.38 | 0.37 | 0.38 | 0.42 | 0.45 |
| Mold Release Properties | ○ | ○ | ○ | ○ | ○ | ○ | Δ |
| Curing Properties | ○ | ○ | ○ | ○ | ○ | ○ | Δ |

TABLE 12

|  | Comp. Ex. 10 | Comp. Ex. 11 | Comp. Ex. 12 | Comp. Ex. 13 | Comp. Ex. 14 | Comp. Ex. 15 |
|---|---|---|---|---|---|---|
| y/x | 0.75 | 1.0 | 1.6 | 2.0 | 3.0 | 3.5 |
| Oxygen Demand (%) | 32.9 | 33.8 | 34.0 | 34.5 | 35.3 | 35.8 |
| Glass Transition Temp. (° C.) | 142 | 165 | 148 | 116 | 92 | 83 |
| Water Absorption coef. (%) | 0.32 | 0.28 | 0.31 | 0.41 | 0.45 | 0.53 |
| Mold Release Properties | ○ | ○ | ○ | ○ | ○ | Δ |
| Curing Properties | ○ | ○ | ○ | ○ | ○ | Δ |

TABLE 13

|  | Comp. Ex. 16 | Comp. Ex. 17 | Comp. Ex. 18 | Comp. Ex. 19 | Comp. Ex. 20 | Comp. Ex. 21 |
|---|---|---|---|---|---|---|
| y/x | 0.75 | 1.0 | 1.6 | 2.0 | 3.0 | 3.5 |
| Oxygen Demand (%) | 28.5 | 28.7 | 28.3 | 28.8 | 29.7 | 30.2 |
| Glass Transition Temp. (° C.) | 148 | 175 | 153 | 125 | 98 | 89 |
| Water Absorption coef. (%) | 0.35 | 0.33 | 0.36 | 0.47 | 0.53 | 0.59 |
| Mold Release Properties | ○ | ○ | ○ | ○ | ○ | Δ |
| Curing Properties | ○ | ○ | ○ | ○ | ○ | Δ |

As described above in the examples, the combination systems of the epoxy resins and the curing agents for the embodiments can exert a more excellent flame retardancy than the combination systems of the orthocresol novolac epoxy resins and the phenol resins which have the high glass transition temperatures and an excellent heat resistance and which are shown in the comparative examples. In addition, it is apparent that the combination systems regarding the present invention are also excellent in the heat resistance typified by the glass transition temperatures and water absorption coefficients. Moreover, the chemical equivalent of the curing agent for each embodiment is in excess of that of the epoxy resin for each embodiment, and they are blended in a hydroxyl group/epoxy group equivalent ratio of 1.25 or more. In consequence, it is apparent that the glass transition temperature and a crosslinking density deteriorate, and at this time, the good flame retardancy can be exerted. When the equivalent ratio is 1.6 or more, the flame retardancy can be particularly improved. However, if this equivalent ratio is in excess of 3.0, molding characteristics such as mold release properties and curing properties deteriorate, and the heat resistance and hygroscopicity resistance are poor, though the flame retardancy is not affected.

The effect of the embodiments is to be able to provide a thermosetting resin composition typified by an epoxy resin composition having the high flame retardancy, heat resistance and hygroscopicity resistance by itself without adding any conventional flame retardant having a large environmental load.

What is claimed is:

1. A thermosetting epoxy resin composition which includes a compound represented by the following formula 1 and a novolac compound represented by the following formula 2 as essential components:

$$X-R_1-X \qquad \text{Formula 1}$$

wherein X is a functional group capable of reacting with a functional group Y in the compound of the formula 2; and $R_1$ is a crystalline functional group having a phenyl group,

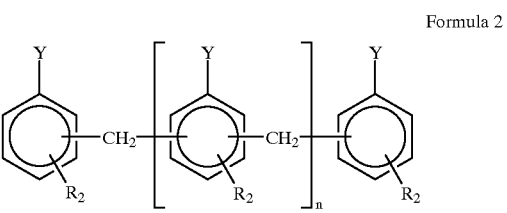

Formula 2 wherein Y is a functional group capable of reacting with the functional group X in the compound of the formula 1; $R_2$ is a functional group capable of reacting with the functional group X in the compound of the formula 1, a hydrocarbon having 1 to 3 carbon atoms, or hydrogen; and n is an integer of 1 to 20, and at least one of the functional group X in the compound represented by the formula 1 and the functional group Y in the compound represented by the formula 2 is a functional group having an epoxy group.

2. The thermosetting epoxy resin composition according to claim 1 wherein the functional group $R_1$ having the phenyl group in the compound represented by the formula 1 is selected from the group consisting of biphenyl, naphthalene, biphenyl ether, 2,2-diphenylpropane, diphenylmethane and analogues thereof.

3. The thermosetting epoxy resin composition according to claim 1 wherein a blend ratio between the compound of the formula 1 and the compound of the formula 2 is such that the total chemical equivalent of the functional group Y and the functional group $R_2$ capable of reacting with the functional group X of the formula 1 in the compound of the formula 2 is in excess of a chemical equivalent which reacts with the functional group X in the compound of the formula 1 and such that a curing reaction can occur.

4. The thermosetting epoxy resin epoxy composition according to Claim 2 wherein a blend ratio between the compound of the formula 1 and the compound of the formula 2 is such that the total chemical equivalent of the functional group Y and the functional group $R_2$ capable of reacting with the functional group X of the formula 1 in the compound of the formula 2 is in excess of a chemical equivalent which reacts with the functional group X in the compound of the formula 1 and such that a curing reaction can occur.

5. The thermosetting epoxy resin composition according to claim 1 wherein a blend ratio between the compound of the formula 1 and the compound of the formula 2 is such that the total chemical equivalent of the functional group Y and the functional group $R_2$ capable of reacting with the functional group X of the formula 1 in the compound of the formula 2 is in excess of a chemical equivalent which reacts with the functional group X in the compound of the formula 1 and such that a curing reaction can occur.

6. A flame retardant epoxy thermosetting resin composition which includes, as essential components, an epoxy resin and a phenol resin analogue mainly having a structure in which a hydroxyl group is bonded to an aromatic hydrocarbon, the epoxy resin being represented by the formula 3:

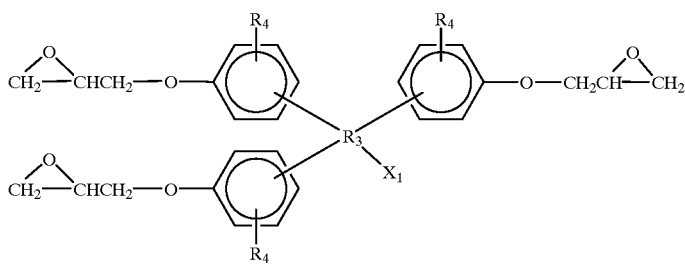

Formula wherein $X_1$ is hydrogen, a glycidyl ether, a hydrocarbon group having 1 to 10 carbon atoms, a glycidyloxyphenyl group or a glycidyloxyphenyl group to the phenyl group of which $R_4$ is attached; $R_3$ is a hydrocarbon having 1 to 10 carbon atoms; and $R_4$ is hydrogen or a hydrocarbon group having 1 to 10 carbon atoms.

7. The thermosetting epoxy resin composition according to claim 6 wherein the phenol resin analogue includes a hydro- phobic group.

8. The thermosetting epoxy resin composition according to claim 7 wherein the hydrophobic group is an aromatic hydrocarbon to which no hydroxyl group is bonded.

9. The thermosetting epoxy resin composition according to claim 6 wherein the epoxy resin is selected from the group consisting of tetrakis(glycidyloxyphenyl)ethane, tetrakis (glycidyloxymethylphenyl) ethane, tetrakis (glycidyloxyphenyl)methane, trikis(glycidyloxyphenyl) ethane, trikis(glycidyloxyphenyl)methane, trikis (glycidyloxyphenyl)methylethane, trikis (glycidyloxyphenyl)methylpropane and tetrakis (glycidyloxyphenyl) pentane.

10. The thermosetting epoxy resin composition according to claim 6 wherein the phenol resin analogue is a phenol novolac resin represented by the formula 4

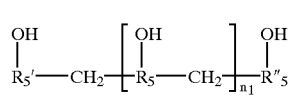

Formula 4 wherein $R_5$, $R'_5$ and $R''_5$ are each a hydrocarbon group having 100 or less carbon atoms and including a naphthalene group and a biphenyl group as essential components which may be in a single state or to which a phenyl group and/or a hydrocarbon group may be bonded; and $n_1$ is from 0 to 20.

11. The thermosetting epoxy resin composition according to claim 8 wherein the phenol resin analogue is selected from the group consisting of naphthol novolac, naphthol-aralkyl resins, trivalent and more phenol novolac analogues including phenolbiphenyl resins, and polyvalent phenolic compounds synthesized from 4,4'-biphenol or naphthalene-diol and bisphenol A, bisphenol F, bisphenol S. hydroquinone, resorcin or catechol in the presence of a condensation agent such as formaldehyde, acetaldehyde, benzaldehyde or p-hydroxybenzaldehyde.

12. The thermosetting epoxy resin composition according to claim 6 wherein the phenol resin is selected from the group consisting of compounds represented by formulae 5, 6 and 7,

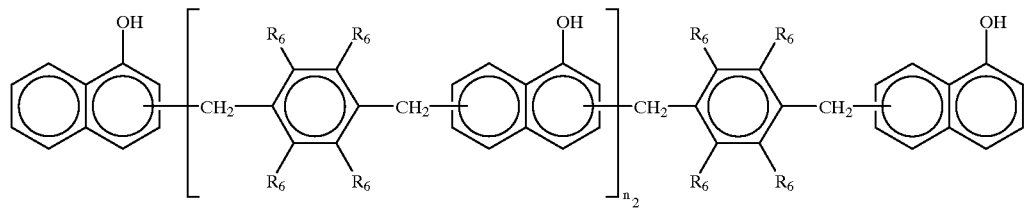

Formula 5

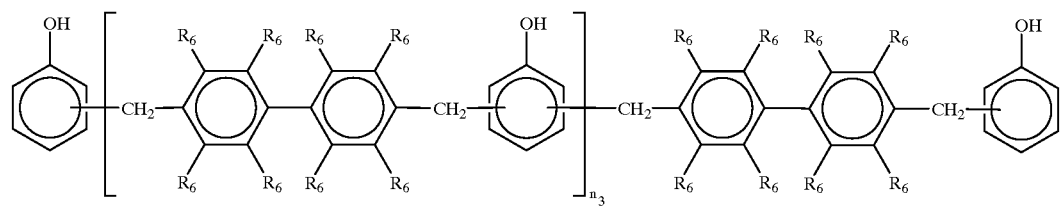

Formula 6

Formula 7

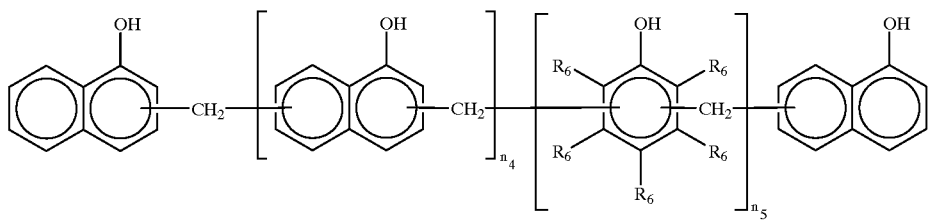

wherein $R_6$ is hydrogen or a hydrocarbon group having 1 to 6 carbon atoms; and $n_2$, $n_3$, $n_4$ and $n_5$ are each an integer of 0 to 20.

13. The thermosetting epoxy resin composition according to claim 1 wherein the hydroxyl group in the phenol resin is in excess of a chemical equivalent which reacts with the epoxy group in the epoxy resin.

14. The thermosetting epoxy resin composition according to claim 4 wherein the hydroxyl group in the phenol resin is in excess of a chemical equivalent which reacts with the epoxy group in the epoxy resin.

15. The thermosetting epoxy resin composition according to claim 1 wherein the hydroxyl group in the phenol resin is in excess of a chemical equivalent which reacts with the epoxy group in the epoxy resin, and a blend ratio between the phenol resin and the epoxy resin is such that the ratio of the hydroxyl group to the chemical equivalent is in the range of 1.25 to 3.0.

16. The thermosetting epoxy resin composition according to claim 4 wherein the hydroxyl group in the phenol resin is in excess of a chemical equivalent which reacts with the epoxy group in the epoxy resin, and a blend ratio between the phenol resin and the epoxy resin is such that the ratio of the hydroxyl group to the chemical equivalent is in the range of 1.25 to 3.0.

17. The thermosetting epoxy resin composition according to claim 1 wherein the hydroxyl group in the phenol resin is in excess of a chemical equivalent which reacts with the epoxy group in the epoxy resin, and a blend ratio between the phenol resin and the epoxy resin is such that the ratio of the hydroxyl group to the chemical equivalent is in the range of 1.6 to 3.0.

18. The thermosetting epoxy resin composition according to claim 4 wherein the hydroxyl group in the phenol resin is in excess of a chemical equivalent which reacts with the epoxy group in the epoxy resin, and a blend ratio between the phenol resin and the epoxy resin is such that the ratio of the hydroxyl group to the chemical equivalent is in the range of 1.6 to 3.0.

* * * * *